Patented Sept. 2, 1947

2,426,637

UNITED STATES PATENT OFFICE 2,426,637

PROCESS OF PREPARING CClF₃

William S. Murray, Wilmington, Del., assignor to E. I. du Pont de Nemours & Company, Wilmington, Del., a corporation of Delaware No Drawing. Application August 7, 1946, Serial No. 688,969

16 Claims. (Cl. 260—653)

This invention relates to a process for preparing $CClF_3$ and more particularly to a continuous vapor phase process for preparing $CClF_3$ from chlorofluoromethanes containing a smaller proportion of fluorine.

The preparation of $CClF_3$ by prior known processes, such as by fluorination, have been uneconomical. In Patent 1,994,035, it is further disclosed that small amounts of $CClF_3$ were obtained in the batchwise liquid phase disproportionation of $CCl_3F$ to produce $CCl_2F_2$. Since $CClF_3$ is of value for use in low temperature refrigeration, it has become desirable to discover a simple and economical method for making this compound in high yields.

It is an object of the present invention to provide a novel method for preparing $CClF_3$. Another object is to provide a practical and commercial method for the manufacture of $CClF_3$ in high yields. Other objects are to advance the art. Still other objects will appear hereinafter.

The above and other objects may be accomplished in accordance with my invention which comprises passing a substantially anhydrous chlorofluoromethane, consisting of carbon, chlorine and fluorine and containing 2 to 3 chlorine atoms, in the vapor phase through an anhydrous aluminum halide catalyst, in which the halogen is chlorine or bromine, at a rate of from 0.1 pound to 2.5 pounds of the chlorofluoromethane for each pound of aluminum halide per hour while maintaining a temperature of from about 100° C. to about 175° C. in the catalyst. I have found that, by such method, I am able to produce $CClF_3$ in excellent yields and in a simple and economical manner which is practical to employ on a commercial scale.

The chlorofluoromethanes, which may be employed in this process, are $CCl_2F_2$ and $CCl_3F$. Either of these chlorofluoromethanes may be employed by itself or I may employ mixtures of the two in any desired proportions. The reactions involved may be simply illustrated by the equations:

(1) 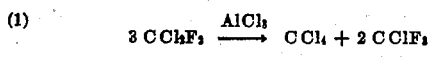

(2) 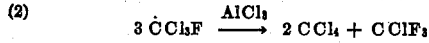

The chlorofluoromethane should be substantially anhydrous, that is, should not contain more than about 0.001% by weight of water, so as to avoid excessive catalyst deterioration by hydrolysis and to minimize the acidity of the product gases.

The catalyst employed may be aluminum chloride or aluminum bromide. The preferred catalyst is aluminum chloride. The aluminum halide catalyst should also be substantially anhydrous. Aluminum chloride of commercial grade has been found to be very satisfactory. The aluminum halide may be employed without a carrier and should be in the form of coarse particles, as grains, lumps, pieces, etc. Catalyst of from 4 mesh to 30 mesh is satisfactory and will usually be desired. For large commercial scale production, it will generally be preferred to have the catalyst particles in a size of from about 4 mesh to about 10 mesh. The catalyst may be supported on an inert carrier, such as silica or alumina gel, if desired. Preferably, such carrier is one which is a good conductor of heat, such as steel Raschig rings, so as to aid in the necessary temperature control.

This disproportionation reaction is complicated by a side reaction which may be represented by the following equation:

Such reaction results in a gradual decrease in the catalyst efficiency, since the $AlF_3$ formed therein does not catalyze the desired reaction. This side reaction also results in a consumption of the starting material to produce undesired products. I have found that this side reaction takes place preferentially at low temperatures and with high rates of feed of the chlorofluoromethane. On the other hand, by suitably controlling the conditions, I am able to minimize the side reaction and favor the desired reaction so as to produce high yields of $CClF_3$.

I have found that it is essential to pass the chlorofluoromethane in the vapor phase into contact with the catalyst. The catalyst should be maintained at a temperature of from about 100° C. to about 175° C. and preferably at from about 120° C. to about 135° C. At temperatures substantially below 100° C., the conversion of the starting chlorofluoromethane is small, the yield of $CClF_3$ is very low and the life of the catalyst is very short. At temperatures substantially above 175° C., there is a strong tendency for sublimation of the catalyst and control of the reaction becomes impractical. Optimum consumptions, yield and catalyst life are obtained at temperatures of from 125° C. to 135° C. In order to maintain the catalyst temperature and the catalyst life, it will usually be desirable to preheat the starting chlorofluoromethane to substantially the reaction temperature, preferably to about 120° C. to about 135° C.

The chlorofluoromethane should be fed to the catalyst at the rate of from about 0.1 pound to about 2.5 pounds for each pound of catalyst per hour. Higher rates of feed of the chlorofluoromethane adversely affect the chlorofluoromethane consumption and the yield of $CClF_3$, render the temperature control difficult and require excessive recycling of unreacted starting material. Optimum results are obtained with a chlorofluoromethane feed rate of from about 0.19 pound to about 0.5 pound for each pound of aluminum halide per hour.

The process may be operated at pressures of from about 5 pounds to about 150 pounds per square inch absolute. As the pressure is increased, the greater concentration of the reactant gas will result in an increased reaction rate and it becomes necessary to provide for more efficient dissipation of the heat evolved so that the temperature can be maintained within the desired limits. This may be accomplished by employing known methods, such as reducing the diameter of the catalyst bed, increasing the linear velocity of the gas and the like. Usually, pressures of from about 15 to about 30 pounds per square inch absolute will be employed. Preferably, I employ pressures of about atmospheric pressure, that is, pressures of from about 15 to about 18 pounds per square inch absolute.

The reactor employed may be constructed of suitable inert material, such as glass, copper and steel. The reactor may be heated by any suitable means, such as steam, water, oil and the like.

The gaseous reaction products will usually be passed through a soda lime tower or similar means for removing hydrochloric acid, and traces of moisture in the gases may be removed by passing the gases over silica gel or other suitable drying agent. The $CClF_3$ may be recovered from the $CCl_4$, unreacted chlorofluoromethane and other products, by fractional condensation or distillation. The unreacted chlorofluoromethane and intermediate products may also be separated from the carbon tetrachloride by fractional condensation or distillation and recycled to the process.

In order to more clearly illustrate my invention, preferred modes of carrying the same into effect and the advantageous results to be obtained thereby, the following examples are given in which the per cent yield of $CClF_3$ is calculated on the basis of the starting chlorofluoromethane consumed.

Example I

Dichlorodifluoromethane (dried vapor phase over $P_2O_5$ and preheated to about 120° C.) was fed at 770 mm. of Hg absolute pressure into a 1" copper reactor containing 5-20 mesh commercial $AlCl_3$ at the rate of 0.35 lbs./lb. $AlCl_3$/hour. The reaction temperature was maintained between 126 and 130° C. by means of an oil bath. Samples of the product gases were collected periodically and fractionated in a Podbielniak still to establish their composition. A typical analysis: Fed 22.4 gms. $CCl_2F_2$. Recovered 22.3 gms. which analysis showed to consist of 11.1 gms. of $CClF_3$; 2.4 gms. of unreacted $CCl_2F_2$; 8.8 gms. of high boilers (mainly $CCl_4$). This calculates to an 89% $CCl_2F_2$ consumption and a $CClF_3$ yield of 96% of theory.

At the completion of this experiment, analysis showed only 0.34% by weight of $AlF_3$ in the catalyst.

| Catalyst Life from Start of $CCl_2F_2$ Flow | | Analysis of Sample, Per Cent of Theory | |
|---|---|---|---|
| Hours | Lbs. $CClF_3$/ Lb. $AlCl_3$ | $CCl_2F_2$ Consumption | $CClF_3$ Yield |
| 2 | 0.35 | 79 | 88 |
| 18.5 | 3.3 | 82 | 93 |
| 35 | 6.2 | 85 | 99 |
| 86 | 15 | 89 | 96 |
| 211 | 37 | 89 | 99 |
| 439 | 77.5 | 90 | 97 |

Example II

With experimental conditions identical in every other respect to those mentioned under Example I, $CCl_2F_2$ was fed to the reactor at the rate of 0.78 lb./lb. $AlCl_3$/hour. The catalyst analyzed 34% $AlF_3$ at the end of this experiment.

| Catalyst Life from Start of $CCl_2F_2$ Flow | | Analysis of Sample, Per Cent of Theory | |
|---|---|---|---|
| Hours | Lbs. $CClF_3$/ Lb. $AlCl_3$ | $CCl_2F_2$ Consumption | $CClF_3$ Yield |
| 39 | 12 | 69 | 97 |
| 140 | 44 | 68 | 94 |
| 236 | 69 | 57 | 80 |
| 266 | 75 | 53 | 84 |

These data show the deleterious effect of short contact time on the catalyst life.

Example III

Preheated, $P_2O_5$-dried $CCl_2F_2$ at atmospheric pressure was fed into a steel reactor, packed with 3.4 lbs. 5-20 mesh $AlCl_3$, at the rate of 0.19 lb./lb. $AlCl_3$/hour. The catalyst temperature was maintained between 122 and 128° C. by means of 20 p. s. i. g. steam in the reactor jacket. A consumption of 94% and a yield of 96% of theory of $CClF_3$ was obtained.

Example IV

This experiment was run under conditions identical with those reported for Example I, except that, in this case, the reaction temperature was held at 100° C. At the end of this experiment, the catalyst contained 10.7% $AlF_3$.

| Catalyst Life from Start of $CCl_2F_2$ Flow | | Analysis of Sample, Per Cent of Theory | |
|---|---|---|---|
| Hours | Lbs. $CClF_3$/ Lb. $AlCl_3$ | $CCl_2F_2$ Consumption | $CClF_3$ Yield |
| 3.8 | 0.12 | 24.5 | 70 |
| 26 | 0.81 | 26.7 | 80 |
| 94 | 2.9 | 15.4 | 100 |
| 215 | 6.7 | 12 | 83 |

A typical analysis: Fed 22.4 g. $CCl_2F_2$. Recovered 21.9 g. which analyzed 19.4 g. of unreacted $CCl_2F_2$, 1.3 g. of high boilers (mainly $CCl_4$) and 1.2 g. of $CClF_3$. This gives a $CCl_2F_2$ consumption of 12% and a $CClF_3$ yield of 83% of theory.

These data show the deleterious effect of low temperature on the catalyst life.

Example V

Trichloromonofluoromethane (dried vapor phase over $P_2O_5$) under about atmospheric pressure was passed at the rate of 0.32 lb./lb. of catalyst/hr. through a bed of 7-12 mesh AlCl₃ contained in a jacketed copper tube and maintained at 126° C. The composition of the product was as follows:

| | Weight per cent |
|---|---|
| $CCl_3F$ | 10 |
| $CCl_2F_2$ | 26 |
| $CClF_3$ | 12 |
| $CCl_4$ | 52 |

*Example VI*

A catalyst was prepared by mechanically mixing 24 g. of AlBr₃ with 100 cc. of 6–16 mesh silica gel. This catalyst was packed into a jacketed 1" copper tube heated with a transfer medium kept at 122° C. Dichlorodifluoromethane, that had been dried over P₂O₅, was passed through the catalyst bed at the rate of 1.1 lbs./lb. of AlBr₃/hr. at about atmospheric pressure. 73 per cent of the CCl₂F₂ disappeared in a single pass and the yield of CClF₃ was 95% of theory.

It will be understood that the preceding examples are given for illustrative purposes solely and that my invention is not to be restricted to the specific embodiments disclosed, but that many variations and modifications can be made without departing from the spirit or scope of my invention. For example, the tempratures and rates of flow may be varied within the limits given. Mixtures of aluminum chloride and aluminum bromide may be used and the catalyst may be supported on inert carriers, such as silica and alumina gel and steel Raschig rings. Furthermore, instead of employing one catalystic reactor, it may, in certain cases, be advantageous to employ two reactors connected in series and by maintaining the second reactor at a slightly higher temperature than the first, increase the conversion of the chlorofluoromethane while employing higher flow rates due to the possibility of obtaining better heat transfer in two reactors than with a single reactor. Also, various other methods may be employed for separating the products.

It will be seen that, by my invention, I have provided a simple and economical method of obtaining CClF₃ in high yields by a continuous vapor phase disproportionation of chlorofluoromethanes, containing a lower concentration of fluorine, in the presence of aluminum halides. By suitable control of the conditions within the preferred range, I am able to obtain consumptions of chlorofluoromethane of at least 90%, yields of CClF₃ of at least 98% and a catalyst life in excess of 75 pounds of CClF₃ per pound of aluminum halide. Thus, it will be apparent that, by my invention, I have made a very substantial advance in the art.

I claim:

1. The process of preparing CClF₃ which comprises passing a substantially anhydrous chlorofluoromethane, consisting of carbon, chlorine and fluorine and containing 2 to 3 chlorine atoms, in the vapor phase through an anhydrous aluminum halide catalyst, in which the halogen is a member of the group consisting of chlorine and bromine, at a rate of from 0.1 pound to 2.5 pounds of chlorofluoromethane for each pound of aluminum halide per hour while maintaining a temperature of from about 100° C. to about 175° C. in the catalyst and then separating CClF₃ from the reaction mixture.

2. The process of preparing CClF₃ which comprises passing a substantially anhydrous chlorofluoromethane, consisting of carbon, chlorine and fluorine and containing 2 to 3 chlorine atoms, in the vapor phase through an anhydrous aluminum halide catalyst, in which the halogen is a member of the group consisting of chlorine and bromine, at a rate of from 0.1 pound to 2.5 pounds of chlorofluoromethane for each pound of aluminum halide per hour while maintaining a temperature of from about 120° C. to about 135° C. in the catalyst and then separating CClF₃ from the reaction mixture.

3. The process of preparing CClF₃ which comprises passing a substantially anhydrous chlorofluoromethane, consisting of carbon, chlorine and fluorine and containing 2 to 3 chlorine atoms, in the vapor phase through an anhydrous aluminum halide catalyst, in which the halogen is a member of the group consisting of chlorine and bromine, at a rate of from about 0.19 pound to about 0.5 pound of chlorofluoromethane for each pound of aluminum halide per hour while maintaining a temperature of from about 120° C. to about 135° C. in the catalyst and then separating CClF₃ from the reaction mixture.

4. The process of preparing CClF₃ which comprises passing a substantially anhydrous chlorofluoromethane, consisting of carbon, chlorine and fluorine and containing 2 to 3 chlorine atoms, in the vapor phase at about atmospheric pressure through an anhydrous aluminum halide catalyst, in which the halogen is a member of the group consisting of chlorine and bromine, at a rate of from about 0.19 pound to about 0.5 pound of chlorofluoromethane for each pound of aluminum halide per hour while maintaining a temperature of from about 120° C. to about 135° C. in the catalyst and then separating CClF₃ from the reaction mixture.

5. The process of preparing CClF₃ which comprises passing substantially anhydrous dichlorodifluoromethane in the vapor phase through an anhydrous aluminum halide catalyst, in which the halogen is a member of the group consisting of chlorine and bromine, at a rate of from 0.1 pound to 2.5 pounds of dichlorodifluoromethane for each pound of aluminum halide per hour while maintaining a temperature of from about 100° C. to about 175° C. in the catalyst and then separating CClF₃ from the reaction mixture.

6. The process of preparing CClF₃ which comprises passing substantially anhydrous dichlorodifluoromethane in the vapor phase through an anhydrous aluminum halide catalyst, in which the halogen is a member of the group consisting of chlorine and bromine, at a rate of from 0.1 pound to 2.5 pounds of dichlorodifluoromethane for each pound of aluminum halide per hour while maintaining a temperature of from about 120° C. to about 135° C. in the catalyst and then separating CClF₃ from the reaction mixture.

7. The process of preparing CClF₃ which comprises passing substantially anhydrous dichlorodifluoromethane in the vapor phase through an anhydrous aluminum halide catalyst, in which the halogen is a member of the group consisting of chlorine and bromine, at a rate of from about 0.19 to about 0.5 pound of dichlorodifluoromethane for each pound of aluminum halide per hour while maintaining a temperature of from about 120° C. to about 135° C. in the catalyst and then separating CClF₃ from the reaction mixture.

8. The process of preparing CClF₃ which comprises passing substantially anhydrous dichlorodifluoromethane in the vapor phase at about atmospheric pressure through an anhydrous aluminum halide catalyst, in which the halogen is a member of the group consisting of chlorine and bromine, at a rate of from about 0.19 pound to about 0.5 pound of dichlorodifluoromethane for each pound of aluminum halide per hour while maintaining a temperature of from about 120° C. to about 135° C. in the catalyst and then separating $CClF_3$ from the reaction mixture.

9. The process of preparing $CClF_3$ which comprises passing substantially anhydrous dichlorodifluoromethane in the vapor phase through anhydrous aluminum chloride at a rate of from 0.1 pound to 2.5 pounds of dichlorodifluoromethane for each pound of aluminum chloride per hour while maintaining a temperature of from about 100° C. to about 175° C. in the aluminum chloride and then separating $CClF_3$ from the reaction mixture.

10. The process of preparing $CClF_3$ which comprises passing substantially anhydrous dichlorodifluoromethane in the vapor phase through anhydrous aluminum chloride at a rate of from 0.1 pound to 2.5 pounds of dichlorodifluoromethane for each pound of aluminum chloride per hour while maintaining a temperature of from about 120° C. to about 135° C. in the aluminum chloride and then separating $CClF_3$ from the reaction mixture.

11. The process of preparing $CClF_3$ which comprises passing substantially anhydrous dichlorodifluoromethane in the vapor phase through anhydrous aluminum chloride at a rate of from about 0.19 pound to about 0.5 pound of dichlorodifluoromethane for each pound of aluminum chloride per hour while maintaining a temperature of from about 120° C. to about 135° C. in the aluminum chloride and then separating $CClF_3$ from the reaction mixture.

12. The process of preparing $CClF_3$ which comprises passing substantially anhydrous dichlorodifluoromethane in the vapor phase at about atmospheric pressure through anhydrous aluminum chloride at a rate of from about 0.19 pound to about 0.5 pound of dichlorodifluoromethane for each pound of aluminum chloride per hour while maintaining a temperature of from about 120° C. to about 135° C. in the aluminum chloride and then separating $CClF_3$ from the reaction mixture.

13. The process of preparing $CClF_3$ which comprises passing substantially anhydrous trichloromonofluoromethane in the vapor phase through an anhydrous aluminum halide catalyst, in which the halogen is a member of the group consisting of chlorine and bromine, at a rate of from 0.1 pound to 2.5 pounds of trichloromonofluoromethane for each pound of aluminum halide per hour while maintaining a temperature of from about 100° C. to about 175° C. in the catalyst and then separating $CClF_3$ from the reaction mixture.

14. The process of preparing $CClF_3$ which comprises passing substantially anhydrous trichloromonofluoromethane in the vapor phase through an anhydrous aluminum halide catalyst, in which the halogen is a member of the group consisting of chlorine and bromine, at a rate of from about 0.19 pound to about 0.5 pound of trichloromonofluoromethane for each pound of aluminum halide per hour while maintaining a temperature of from about 120° C. to about 135° C. in the catalyst and then separating $CClF_3$ from the reaction mixture.

15. The process of preparing $CClF_3$ which comprises passing substantially anhydrous trichloromonofluoromethane in the vapor phase through anhydrous aluminum chloride at a rate of from 0.1 pound to 2.5 pounds of trichloromonofluoromethane for each pound of aluminum chloride per hour while maintaining a temperature of from about 100° C. to about 175° C. in the aluminum chloride and then separating $CClF_3$ from the reaction mixture.

16. The process of preparing $CClF_3$ which comprises passing substantially anhydrous trichloromonofluoromethane in the vapor phase through anhydrous aluminum chloride at a rate of from about 0.19 pound to about 0.5 pound of trichloromonofluoromethane for each pound of aluminum cholride per hour while maintaining a temperature of from about 120° C. to about 135° C. in the aluminum chloride and then separating $CClF_3$ from the reaction mixture.

WILLIAM S. MURRAY.